(12) United States Patent
Murphy

(10) Patent No.: US 8,353,980 B2
(45) Date of Patent: Jan. 15, 2013

(54) FLUE GAS SCRUBBING APPARATUS AND PROCESS

(75) Inventor: David William Murphy, Clinton, OH (US)

(73) Assignee: Marsulex Environmental Technologies Corporation, Lebanon, PA (US)

( * ) Notice: Subject to any disclaimer, the term of this patent is extended or adjusted under 35 U.S.C. 154(b) by 264 days.

(21) Appl. No.: 12/630,117

(22) Filed: Dec. 3, 2009

(65) Prior Publication Data

US 2010/0139488 A1 Jun. 10, 2010

Related U.S. Application Data

(60) Provisional application No. 61/120,112, filed on Dec. 5, 2008.

(51) Int. Cl.
*B01D 53/14* (2006.01)

(52) U.S. Cl. ............ 95/199; 95/211; 95/235; 95/236; 96/234; 96/235; 96/290; 423/243.02; 423/243.03; 423/243.09

(58) Field of Classification Search .......... 95/199, 95/211, 235–236; 96/234, 236, 290; 423/243.02, 423/243.03, 243.09
See application file for complete search history.

(56) References Cited

U.S. PATENT DOCUMENTS

| | | | | |
|---|---|---|---|---|
| 2,405,747 A | * | 8/1946 | Hixson et al. | 423/539 |
| 3,369,869 A | * | 2/1968 | Deiters | 423/352 |
| 3,700,216 A | * | 10/1972 | Uitti et al. | 261/114.1 |
| 3,997,303 A | * | 12/1976 | Newton | 95/284 |
| 4,164,548 A | | 8/1979 | Vitali et al. | |
| 4,690,807 A | * | 9/1987 | Saleem | 423/243.03 |
| 4,834,936 A | * | 5/1989 | Hirose | 376/310 |
| 4,956,127 A | * | 9/1990 | Binkley et al. | 261/114.1 |
| 5,362,458 A | * | 11/1994 | Saleem et al. | 423/243.06 |
| 6,187,278 B1 | * | 2/2001 | Brown et al. | 423/243.06 |
| 6,214,097 B1 | * | 4/2001 | Laslo | 96/236 |
| 6,221,325 B1 | * | 4/2001 | Brown et al. | 423/243.06 |
| 6,277,343 B1 | * | 8/2001 | Gansley et al. | 423/210 |
| 6,422,539 B1 | * | 7/2002 | Burton et al. | 261/114.4 |
| 7,255,842 B1 | * | 8/2007 | Yeh et al. | 423/234 |
| 7,445,200 B2 | | 11/2008 | Lee et al. | |
| 2003/0086847 A1 | * | 5/2003 | Heibel et al. | 422/222 |
| 2010/0024646 A1 | * | 2/2010 | Brookman | 95/154 |

FOREIGN PATENT DOCUMENTS

| | | | |
|---|---|---|---|
| DE | 3733319 A1 | * | 4/1989 |
| DE | 3733319 A1 | * | 4/1989 |
| DE | 4201033 A1 | * | 7/1993 |
| DE | 4201033 A1 | * | 7/1993 |

\* cited by examiner

*Primary Examiner* — Duane Smith
*Assistant Examiner* — Ives Wu
(74) *Attorney, Agent, or Firm* — Hartman Global IP Law; Gary M. Hartman; Domenica N.S. Hartman

(57) ABSTRACT

An apparatus and process for removing acidic gases from flue gases produced by, for example, utility and industrial facilities. The acidic gases are removed as the flue gas flows upward through a contact zone within a passage, where the flue gas is contacted with an ammonium sulfate-containing scrubbing solution to absorb the acidic gases from the flue gas. The scrubbing solution and absorbed acidic gases therein are then accumulated, and ammonia and an oxygen-containing gas are injected into the accumulated scrubbing solution to react the absorbed acidic gases and produce ammonium sulfate. An acid solution is flowed across the passage above the contact zone of the passage, and the scrubbed flue gas is flowed upward through the acid solution to remove unreacted ammonia from the scrubbed flue gas. The acid solution is then removed from the passage after the acid solution has been contacted by the scrubbed flue gas.

18 Claims, 1 Drawing Sheet

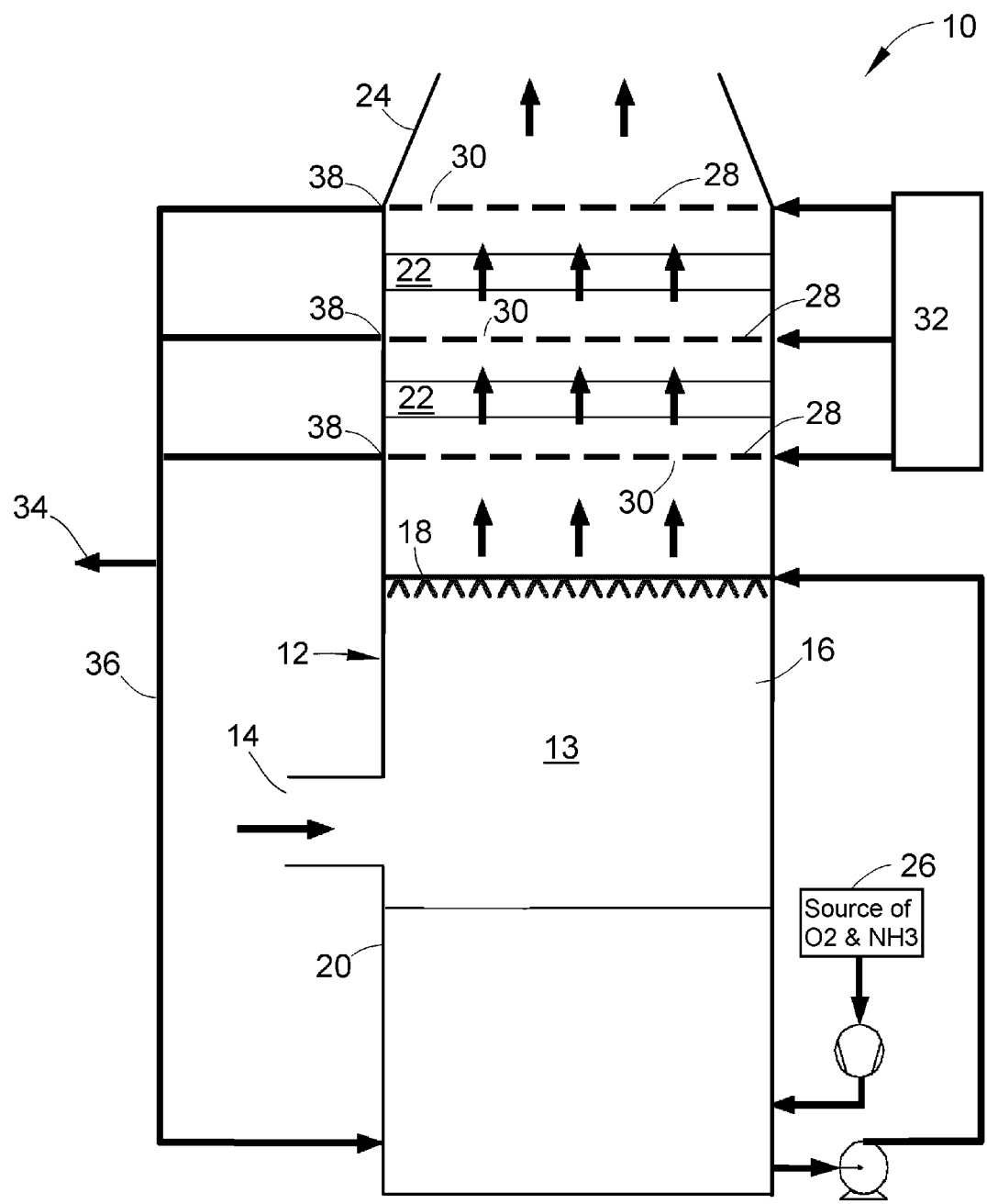

FLUE GAS SCRUBBING APPARATUS AND PROCESS

CROSS REFERENCE TO RELATED APPLICATIONS

This application claims the benefit of U.S. Provisional Application No. 61/120,112, filed Dec. 5, 2008, the contents of which are incorporated herein by reference.

BACKGROUND OF THE INVENTION

The present invention generally relates to gas-liquid contactors and absorbers used in the removal of acidic gases, such as from utility and industrial flue gases. More particularly, this invention is directed to a wet flue gas desulfurization process and apparatus that use an ammonia-containing scrubbing solution to remove sulfur dioxide and other acidic gases from flue gases, and are further capable of reducing the presence of free ammonia in the scrubbed flue gases.

Gas-liquid contactors and absorbers (hereinafter, absorbers) are widely used to remove substances such as acidic constituents and particulate matter from combustion or flue gases produced by utility and industrial plants. Often of particular concern is sulfur dioxide ($SO_2$) produced by the combustion of fossil fuels and various industrial operations. Sulfur dioxide and other acidic gases are known to be hazardous to the environment, and therefore their emission into the atmosphere is regulated by clean air statutes. The method by which acidic gases are removed with a gas-liquid absorber or other type of flue gas scrubber is known as wet flue gas desulfurization (FGD).

The cleansing action produced by gas-liquid absorbers is typically derived from the passage of gas through a tower cocurrently or countercurrently to a descending liquid that absorbs the acidic gases. A conventional configuration for a gas-liquid absorber includes a tower equipped with an inlet duct through which combustion (flue) gas enter and rise through the tower. Above the inlet duct, the tower is equipped with multiple banks of spray headers or other suitable devices to introduce a contact medium, typically an alkaline slurry or solution, into the tower. Intimate contact between the contact medium and the flue gas rising through the tower results in a cleansing action in which certain gases in the flue gas are entrapped with the contact medium. The cleansed (scrubbed) flue gas continues to rise through the tower, typically passes through a mist eliminator, and may then be heated or passed directly to the atmosphere. The contact medium falls within the tower and accumulates in a tank, from which the contact medium is recycled to the spray headers. While in the tank, the absorbed gases can be reacted to produce a byproduct that is removed before the contact medium is returned to the spray headers.

Calcium-based slurries, sodium-based solutions and ammonia-based solutions are typical alkaline scrubbing liquids used in flue gas scrubbing operations. While gas-liquid absorbers utilizing calcium-based slurries generally perform satisfactorily, their operation results in the production of large quantities of wastes or gypsum, the latter having only nominal commercial value. In contrast, ammonia-based flue gas desulfurization processes have been used in the art to produce a more valuable ammonium sulfate (($NH_4)_2SO_4$) fertilizer, as taught by U.S. Pat. Nos. 4,690,807 and 5,362,458, each of which are assigned to the assignee of the present invention. In these processes, referred to as ammonium sulfate flue gas desulfurization (AS-FGD), as a flue gas flow upward through a tower, acidic gases present in the flue gas are absorbed by an ammonium sulfate solution containing ammonia. Afterwards, the solution is accumulated in a tank, where the absorbed sulfur dioxide reacts with additional ammonia injected into the tank to form ammonium sulfite (($NH_4)_2SO_3$) and ammonium bisulfite ($NH_4HSO_3$), which are oxidized with air or oxygen injected into the tank to form ammonium sulfate and ammonium bisulfate ($NH_4HSO_4$), the latter of which reacts with ammonia in the tank to form additional ammonium sulfate. A portion of the ammonium sulfate solution and/or ammonium sulfate crystals that form in the solution can be drawn off to yield the desired ammonium sulfate fertilizer byproduct of this reaction. A sufficient amount of ammonium sulfate is preferably removed from the ammonium sulfate solution prior to delivery to the tower in order to maintain ammonium sulfate at a desired concentration in the solution.

In addition to being required to react with sulfur dioxide to produce ammonium sulfate, ammonia also serves to increase the efficiency of sulfur dioxide removal by reducing the acidity of the ammonium sulfate solution introduced into the tower. With the absorption of sulfur dioxide in the tower, the ammonium sulfate solution becomes more acidic and its ability to absorb sulfur dioxide is reduced. For example, without added ammonia the pH of the ammonium sulfate solution may be in the range of about 4 to about 5.5, but with added ammonia the solution has a higher pH, for example about 5 to about 6, depending on control set points and operating conditions, including the $SO_2$ concentration in the flue gas. However, oxidation of an ammonium sulfite solution is slower with higher pH levels. Higher pH levels are also associated with the release of free ammonia from the solution, often termed "ammonia slip." In addition to incurring an economic loss because of lost ammonia, free ammonia in the scrubbed flue gases tends to react with any uncaptured sulfur dioxide and trioxide to create an ammonium sulfate aerosol that is visible as a blue or white plume in the stack discharge, leading to secondary pollution problems.

Controlling the amount of free ammonia in the desulfurization process is in part a function of the ammonia vapor pressure, which results from a combination of pH and levels of unoxidized ammonium sulfite that remain in the absence of sufficient oxygen. Ammonia slip can be controlled with, for example, a wet electrostatic precipitator (ESP) installed at the top of the absorber or installed in a separate module downstream of the absorber. However, a drawback is that wet ESPs are expensive and consume considerable power, making them expensive to install and operate. Another method used to control ammonia slip is to operate the scrubbing system at the lowest pH possible, coupled with a high liquid-to-gas ratio (L/G). While this method does not require additional equipment, it at best can only lower the slip to about 10 ppm, and any upsets in the control will cause higher spikes.

In view of the above, there is an ongoing effort to promote efficient oxidation rates and reduce the release of free ammonia in desulfurization processes that use ammonium sulfate scrubbing solutions.

BRIEF DESCRIPTION OF THE INVENTION

The present invention provides an apparatus and process for removing acidic gases from flue gases produced by processing operations of the type carried out in utility and industrial facilities. The apparatus is generally a gas-liquid absorber whose operation uses an ammonium sulfate-containing scrubbing solution to absorb acidic gases from flue gases and produce additional ammonium sulfate as a valuable byproduct.

According to a first aspect of the invention, a process for removing acidic gases from a flue gas entails causing the flue gas to flow upward through a contact zone within a passage, and contacting the flue gas within the contact zone with an ammonium sulfate-containing scrubbing solution to absorb the acidic gases from the flue gas and yield a scrubbed flue gas. The scrubbing solution and the absorbed acidic gases therein are then accumulated, and ammonia and oxygen (including any sources thereof) are injected into the accumulated scrubbing solution to react the absorbed acidic gases and produce ammonium sulfate. An acid solution is flowed across the passage above the contact zone of the passage, and the scrubbed flue gas is flowed upward through the acid solution flowing across the passage to remove unreacted ammonia from the scrubbed flue gas. The acid solution is then removed from the passage after the acid solution has been contacted by the scrubbed flue gas.

According to a second aspect of the invention, an apparatus for removing acidic gases from a flue gas includes a passage and a contact zone within the passage, means for contacting the flue gas with an ammonium sulfate-containing scrubbing solution as the flue gas flows upward through the contact zone so as to absorb the acidic gases from the flue gas and yield a scrubbed flue gas, means for accumulating the scrubbing solution and the absorbed acidic gases therein, and means for injecting ammonia and oxygen (including any sources thereof) into the accumulating means to react the absorbed acidic gases and produce ammonium sulfate. The apparatus further comprises means for flowing an acid solution across the passage above the contact zone of the passage so that the scrubbed flue gas flowing upward through the passage contacts the acid solution flowing across the passage and unreacted ammonia is removed from the scrubbed flue gas by the acid solution, and means for removing the acid solution from the passage after the acid solution has been contacted by the scrubbed flue gas.

In view of the above, the process and apparatus of this invention are capable of wet flue gas desulfurization using an ammonia-containing scrubbing solution to remove sulfur dioxide and other acidic gases from flue gases, and are further capable of reducing the presence of free ammonia in the scrubbed flue gases. With this method, it is believed that ammonia slip can be reduced to levels of about 3 ppm and less.

Other aspects and advantages of this invention will be better appreciated from the following detailed description.

BRIEF DESCRIPTION OF THE DRAWINGS

FIG. 1 is a schematic representation of a gas-liquid absorber in accordance with an embodiment of this invention.

DETAILED DESCRIPTION OF THE INVENTION

FIG. 1 schematically illustrates an apparatus generally referred to as a gas-liquid contactor or absorber 10 configured in accordance with an embodiment of this invention. The absorber 10 is configured to perform an ammonia-based flue gas desulfurization process, by which sulfur dioxide and other acidic gases are absorbed from a flue gas with an ammonium sulfate scrubbing solution or slurry (hereinafter referred to simply as "solution" for purposes of convenience), and the absorbed sulfur dioxide is reacted with ammonia and oxygen (which as used herein includes oxygen and sources of oxygen, including but not limited to air) to produce ammonium sulfate as a valuable byproduct. While the absorber 10 is illustrated as being of a particular construction, those skilled in the art will recognize that the teachings of this invention can be applied to structures that differ in appearance from the absorber 10 of FIG. 1, and used in other processes to remove undesirable gases, mist, dust, fumes, smoke and/or particulate matter from a stream of gas.

The absorber 10 is shown as including a tower 12 having an upright construction and equipped with an inlet duct 14 through which flue gas enters the tower 12 and flows upward through a passage 13 defined by the tower 12. As is well known in the art, the source of the flue gas may be a process involving the combustion of fossil fuels, including processes carried out at power generation and industrial facilities, as well as various other utility and industrial facilities and operations by which undesirable gases or particulate matter are produced. Above the inlet duct 14, the tower 12 has a contact zone 16 within which spray headers 18 introduce a scrubbing solution into the tower 12 for intimate contact with the rising flue gas, resulting in absorption of acidic gases from the flue gas. While only one spray header 18 is shown, it is common practice and within the scope of the invention to use multiple levels of spray headers 18. Furthermore, various other or additional devices can be used to introduce the scrubbing solution into the tower passage 13, including atomizers and other devices known in the art that are capable of delivering a spray, droplets or mist of the scrubbing solution. Trays, packing, or other types of devices can also be employed within the contact zone 16 to increase contact between the scrubbing solution and the flue gas. The scrubbing solution can be supplied to the contact zone 16 from a tank 20 located at the lower end of the tower 12. Aside from providing a suitable structure capable of accumulating and containing the scrubbing solution, the configuration of the tank 20 is not critical and various other containment structures are within the scope of the invention. The scrubbed flue gas that leaves the tower 12 passes through one or more mist eliminators 22 and is eventually delivered to a stack (not shown) or other suitable equipment through an outlet duct 24, as is known in the art.

According to a preferred aspect of the invention, the absorber 10 performs an ammonium sulfate flue gas desulfurization (AS-FGD) process, and the scrubbing solution is an aqueous ammonium sulfate solution containing free dissolved ammonia as a reagent for producing ammonium sulfate as the byproduct of the desulfurization process. As known in the art, droplets of the ammonium sulfate solution contact the flue gas within the contact zone 16 to remove acidic gases from the flue gas by absorption. In addition, the ammonium sulfate solution serves as the liquid vehicle for delivering the ammonia to the tower 12, where the ammonia reacts with the sulfur dioxide absorbed by the scrubbing solution to form ammonium sulfite and ammonium bisulfite. If hydrogen chloride and hydrogen fluoride are present in the flue gas, as is typical for flue gases produced by the combustion of coal, oil and sulfur-bearing fuels, these acidic gases are also captured to form ammonium chloride and ammonium fluoride. Once the solution containing the absorbed acidic gases has fallen from the contact zone 16, through the passage 13 and into the tank 20, oxygen from a suitable oxygen-containing source 26 (e.g., oxygen, air, etc.) can be added to the solution to oxidize the ammonium sulfite and bisulfite, forming ammonium sulfate and ammonium bisulfate, the latter of which reacts with ammonia to form ammonium sulfate. This reaction can be promoted by injecting additional ammonia into the tank 20. FIG. 1 represents additional ammonia as being injected with the oxygen into the tank 20, though the ammonia could be introduced separately from the oxygen. The injection of additional ammonia into the scrubbing solution also has the beneficial effect of increasing the pH of the solution so that the solution is more reactive for efficient capture of sulfur oxide gases when returned to the contact zone 16. Spargers and various other devices are known and used in the art for injecting ammonia and oxygen (or an oxygen-containing gas) into the solution with the tank 20, and such devices and injection techniques are within the scope of the invention.

According to a preferred aspect of the invention, the absorber 10 of FIG. 1 is shown modified to include one or more trays 28 located beneath, between, and/or above the mist eliminators 22. The trays 28 can be similar to fractionation trays used in fractionation processes, in that multiple openings 30 pass entirely through each tray 28 from its upper surface to its lower surface. An acid solution 32 is delivered to the trays 28, causing the acid solution to flood or otherwise cover the trays 28 as the scrubbed flue gas passes up through the openings 30 in the trays 28. The acid solution 32 is chosen so that contact with the scrubbed flue gas results in a reaction between the acid solution 32 and any unreacted (free) ammonia in the scrubbed flue gas. FIG. 1 shows that the reacted acid solution 32 can be drawn from the trays 28 and discarded through an outlet pipe 34, or recycled through a downcomer 36 to the absorber tank 20. For purposes of the latter, sulfuric acid is a desirable constituent of the acid solution 32, in that the reaction product of sulfuric acid and ammonia is ammonium sulfate, which is the desired byproduct of the AS-FGD process. However, other or alternative constituents of the acid solution 32 are foreseeable, including other acids that are soluble in water, reactive with ammonia, and not excessively volatile.

The trays 28 can have a variety of configurations, for example, a solid platform that has been perforated or otherwise formed to contain the openings 30. Each tray 28 covers the entire cross-section of the tower 12, such that all of the scrubbed flue gas flowing upward through the passage 13 from the contact zone 16 will flow through the openings 30. While multiple trays 28 are shown in FIG. 1 and may be used to promote contact between the acid solution 32 and the scrubbed flue gas, a single tray 28 is believed to be preferred to minimize the impact on the height of the tower 12, performance of the mist eliminators 22, and consumption of the acid solution 32. The type and location of the tray(s) 28 also impact tower height, mist eliminator performance, and acid consumption. A tray 28 located below a mist eliminator 22 has minimal affect on tower height and allows for the use of a weeping-type tray 28, whose openings 30 are sized so that at least a portion of the acid solution 32 drips down through the tray 28 and is directly returned to the tank 20 below. The need for the outlet pipe 34 and downcomer 36 is eliminated if all of the acid solution 32 returns to the tank 20 through the openings 30. However, a tray 28 located below a mist eliminator 22 generally necessitates the use of a more efficient mist eliminator 22 and increases acid consumption. In contrast, a tray 28 located above any mist eliminator 22 will generally be configured so that essentially none of the acid solution 32 drips down through the tray 28, but instead exits the passage 13 through one or more outlets 38 associated with the tray 28. A tray 28 located above all of the mist eliminates 22 will have a greater impact on tower height and increase the likelihood of mist carryover from the absorber 10. Locating a single tray 28 between a pair of mist eliminators 22 will have the greatest impact on tower height, but is believed to be a preferred location in terms of having the least impact on mist eliminator performance and acid consumption.

The tray openings 30 are preferably of sufficient size and number to promote contact between the scrubbed flue gas flowing through each tray 28 and the acid solution 32 flowing across the tray 28, as well as promote an even distribution of the acid solution across the surface of the tray 28 and therefore the cross-section of the passage 13. For both weeping-type and nonweeping-type trays 28, suitable sizes for the openings 30 can be determined analytically or through trial and error. In the case of a tray 28 that is not of the weeping-type, the openings 30 are sized relative to the velocity or volumetric flow of flue gas so that essentially all of the acid solution 32 is retained on the tray 28, instead of flowing downward through the openings 30 and into the contact zone 16. For typical flue gas velocities of about 3 to about 4.4 m/s employed in scrubbers used in utility and industrial installations, it is believed that suitable results can be achieved with a nonweeping-type tray 28 whose openings 30 are not greater than about ten centimeters in diameter, for example not greater than five centimeters in diameter, so that the acid solution 32 containing the reaction product does not drip down through the openings 30, but instead exits the tower 12 through the tray outlets 38 and thereafter flows to the outlet pipe 34 for disposal or to the downcomer 36 for return to the tank 20. Larger openings 30 can be used for a weeping-type tray 28 through which at least a portion of the acid solution 32 is desired to drip through the tray 28 and directly return to the tank 20 below.

The trays 28 are believed to be uncomplicated devices that are particularly well suited for achieving intimate contact between the acid solution 32 and scrubbed flue gas, and capable of reducing ammonia slip to levels of about 3 ppm and less. However, other devices or techniques capable of such contact are foreseeable. In effect, any device could be used that is capable of transporting or otherwise flowing the acid solution 32 across the passage 13, promoting intimate contact with a gas flowing upward through the device, and optionally retaining the acid solution 32 as it flows across the passage 13 so as to substantially avoid the loss of the acid solution 32 to the passage 13 below. In addition, while the outlets 38 can be simple drain ports located in the wall of the tower 12 adjacent the trays 28, various other or additional devices could be used that are capable of removing or promoting the removal of the acid solution 32 from the passage 13 after contact with the scrubbed flue gas.

While the invention has been described in terms of a specific embodiment, it is apparent that other forms could be adopted by one skilled in the art. For example, the functions of the individual components of the absorber 10 could be performed by components of different construction but capable of a similar (though not necessarily equivalent) function, and the absorber 10 could differ in appearance and construction from the embodiment shown in the FIGURE. Therefore, the scope of the invention is to be limited only by the following claims.

The invention claimed is:

1. A process for removing acidic gases from a flue gas, the process comprising:
    causing the flue gas to flow upward through a contact zone within a passage;
    contacting the flue gas within the contact zone with an ammonium sulfate-containing scrubbing solution to absorb the acidic gases from the flue gas and yield a scrubbed flue gas;
    accumulating the scrubbing solution and the absorbed acidic gases;
    injecting oxygen and ammonia into the accumulated scrubbing solution to react the absorbed acidic gases and produce ammonium sulfate;
    flowing an acid solution across the passage on at least a first perforated tray located within the passage above the contact zone of the passage and above at least a first mist eliminator within the passage;

flowing the scrubbed flue gas upward through openings in the first perforated tray and through the acid solution on the first perforated tray to remove unreacted ammonia from the scrubbed flue gas, the openings in the first perforated tray being sized relative to the flow of the flue gas so that essentially all of the acid solution is retained on the first perforated tray and does not flow downward through the openings thereof and into the contact zone; and removing the acid solution from the passage after the acid solution has been contacted by the scrubbed flue gas.

2. The process according to claim 1, wherein the first perforated tray is below at least a second mist eliminator that is located above the contact zone within the passage, and the first perforated tray is between the first and second mist eliminators.

3. The process according to claim 1, further comprising flowing the acid solution across the passage on a second perforated tray located within the passage above the contact zone of the passage, the second perforated tray having openings therein that are sized relative to the flow of the flue gas so that at least a portion of the acid solution on the second perforated tray flows downward through the openings thereof and into the contact zone.

4. The process according to claim 3, wherein the second perforated tray is located below the first mist eliminator.

5. The process according to claim 1, wherein the acid solution contains sulfuric acid.

6. The process according to claim 5, wherein the acid solution removed from the passage contains ammonium sulfate.

7. The process according to claim 1, further comprising disposing of the acid solution removed from the passage.

8. The process according to claim 1, further comprising delivering the acid solution removed from the passage to a tank containing the accumulated scrubbing solution.

9. The process according to claim 1, wherein the process is performed within a utility or industrial facility and the flue gas is a product of the facility.

10. An apparatus for removing acidic gases from a flue gas, the apparatus comprising:

a passage and a contact zone within the passage;

means for contacting the flue gas with an ammonium sulfate-containing scrubbing solution as the flue gas flows upward through the contact zone so as to absorb the acidic gases from the flue gas and yield a scrubbed flue gas;

means for accumulating the scrubbing solution and the absorbed acidic gases therein;

means for injecting oxygen and ammonia into the accumulating means to react the absorbed acidic gases and produce ammonium sulfate;

at least first and second mist eliminators within the passage and above the contact zone;

at least a first perforated tray over which an acid solution flows across the passage above the contact zone of the passage, the first perforated tray being located above the first mist eliminator and below the second mist eliminator, the first perforated tray being sized and comprising openings therethrough so that the scrubbed flue gas flowing upward through the passage flows upward through the openings in the first perforated tray and contacts the acid solution flowing across the passage on the first perforated tray, and unreacted ammonia is removed from the scrubbed flue gas by the acid solution, the openings in the first perforated tray being sized relative to the flow of the flue gas so that essentially all of the acid solution is retained on the first perforated tray and does not flow downward through the openings thereof and into the contact zone; and means for removing the acid solution from the passage after the acid solution has been contacted by the scrubbed flue gas.

11. The apparatus according to claim 10, further comprising a second perforated tray located within the passage above the contact zone of the passage and below the first mist eliminator, wherein the acid solution flows across the passage on the second perforated tray and the second perforated tray is sized and comprises openings therein so that the scrubbed flue gas flowing upward from the contact zone flows upward through the openings in the second perforated tray to contact the acid solution flowing across the second perforated tray.

12. The apparatus according to claim 11, wherein the openings in the second perforated tray are sized relative to the flow of the flue gas so that at least a portion of the acid solution on the second perforated tray flows downward through the openings thereof and into the contact zone.

13. The apparatus according to claim 11, further comprising at least a third perforated tray within the passage, above the second mist eliminator, and above the contact zone.

14. The apparatus according to claim 10, wherein the acid solution contains sulfuric acid.

15. The apparatus according to claim 14, wherein the acid solution removed from the passage contains ammonium sulfate.

16. The apparatus according to claim 10, further comprising means for disposing of the acid solution removed from the passage.

17. The apparatus according to claim 10, further comprising means for delivering the acid solution removed from the passage to the accumulating means.

18. The apparatus according to claim 10, wherein the apparatus is installed within a utility or industrial facility and the flue gas is a product of the facility.

* * * * *